(12) United States Patent
Aubin et al.

(10) Patent No.: US 10,552,826 B2
(45) Date of Patent: Feb. 4, 2020

(54) SELECTING AN APPLICATION ON A CARD

(71) Applicant: IDEMIA FRANCE, Courbevoie (FR)

(72) Inventors: Yann-Loïc Aubin, Colombes (FR);
Christophe Courtois, Colombes (FR);
Gilles Leseigneur, Colombes (FR)

(73) Assignee: IDEMIA France, Courbevoie (FR)

( * ) Notice: Subject to any disclaimer, the term of this patent is extended or adjusted under 35 U.S.C. 154(b) by 0 days.

(21) Appl. No.: 16/095,182

(22) PCT Filed: Apr. 21, 2017

(86) PCT No.: PCT/EP2017/059455
§ 371 (c)(1),
(2) Date: Oct. 19, 2018

(87) PCT Pub. No.: WO2017/182600
PCT Pub. Date: Oct. 26, 2017

(65) Prior Publication Data
US 2019/0147437 A1 May 16, 2019

(30) Foreign Application Priority Data
Apr. 21, 2016 (EP) .................................. 16305463

(51) Int. Cl.
*G06K 7/08* (2006.01)
*G06K 19/06* (2006.01)
(Continued)

(52) U.S. Cl.
CPC ....... *G06Q 20/3574* (2013.01); *G06K 7/0065* (2013.01); *G06K 19/07707* (2013.01); *G06K 19/07715* (2013.01); *G06Q 20/341* (2013.01)

(58) Field of Classification Search
USPC .................. 235/380, 449, 451, 492, 493
See application file for complete search history.

(56) References Cited

U.S. PATENT DOCUMENTS 8,196,131 B1   6/2012   Von Behren et al.
8,297,520 B1   10/2012   Wakerly et al.
(Continued)

FOREIGN PATENT DOCUMENTS

WO    2014/202261 A1   12/2014

OTHER PUBLICATIONS

International Search Report and Written Opinion, dated May 12, 2017, from corresponding PCT application No. PCT/EP2017/059455.

*Primary Examiner* — Tuyen K Vo
(74) *Attorney, Agent, or Firm* — Young & Thompson

(57) ABSTRACT

A card includes a secure element hosting a plurality of applications, at least one external interface and a user interface having user-selectable modes. Each mode is associated with multiple applications. A store at the secure element holds response data for responding to the external card reader and correspondence data. The response data includes data about the applications hosted by the card and the correspondence data indicates, for each mode, a correspondence between the mode and the response data to be sent for that mode. The card allows a user to select one of the plurality of modes for use when the card next communicates with the external reader. The card stores a mode indicator indicative of a mode selected by the user at the user interface and stores a usage indicator indicative of whether the card has communicated with an external reader since the mode indicator was stored.

20 Claims, 11 Drawing Sheets

(51) Int. Cl.
*G06Q 20/34* (2012.01)
*G06K 7/00* (2006.01)
*G06K 19/077* (2006.01)

(56) References Cited

U.S. PATENT DOCUMENTS

| | | | |
|---|---|---|---|
| 9,864,944 B2 | 1/2018 | Radu et al. | |
| 2002/0120583 A1* | 8/2002 | Keresman, III | C07D 209/88 |
| | | | 705/65 |
| 2005/0184165 A1 | 8/2005 | De Jong | |
| 2011/0244796 A1* | 10/2011 | Khan | H04W 4/80 |
| | | | 455/41.1 |
| 2012/0254038 A1* | 10/2012 | Mullen | G06Q 20/3552 |
| | | | 705/44 |
| 2012/0265685 A1* | 10/2012 | Brudnicki | G06Q 30/06 |
| | | | 705/44 |
| 2013/0109307 A1* | 5/2013 | Reisgies | H04L 63/08 |
| | | | 455/41.1 |
| 2013/0110719 A1* | 5/2013 | Carter | G06Q 20/204 |
| | | | 705/44 |
| 2016/0358180 A1* | 12/2016 | Van Os | G06Q 20/3278 |

\* cited by examiner

```
90
   6F{FCI template
    84{DF name}
     A5{FCI proprietary template
      88{SFI of directory elementary file}   91
     }
   }
```

```
92
    70{payment system directory record
     61{application template
      4F{AID}
      50{label}                              93
      87{application priority indicator}
     }
    }
```

```
95
   6F{FCI template
    84{DF name}
    A5{FCI proprietary template
     BF0C{FCI discretionary data
        61{application template
96 ─── 4F{AID}
          87{application priority indicator}
        }
        61{application template
96 ─── 4F{AID}
          87{application priority indicator}
        }
        61{application template
96 ─── 4F{AID}
          87{application priority indicator}
        }
        61{application template
96 ─── 4F{AID}
          87{application priority indicator}
        }
        61{application template
96 ─── 4F{AID}
          87{application priority indicator}
        }
      }
     }
    }
```

Fig. 6B

SELECTING AN APPLICATION ON A CARD

BACKGROUND

Integrated circuit cards (ICC), or chip cards, are in widespread use. Chip cards typically support a contact interface in which an electrical connection is made between an external reader and conductive pads on the surface of the chip card, or a contactless interface in which a wireless (near field communication) connection is made between an external reader and an antenna within the chip card. Any reading of data from the card, or writing of data to the chip card, is performed via the contact interface or the contactless interface. Conventionally, it has been necessary for the chip card to be connected to a terminal having a card reader before a user can make any changes to the chip card, and any changes are made by the user interacting with the terminal and communication between the card reader and the chip card.

More recently, chip cards have been developed with a user interface such as a button or keyboard, and indicator lights or a display. A card of this kind is described in WO 2014/202261 A1. One function of this kind of card is to allow a user to select which of the applications on the card that they wish to use.

There is some concern that cards equipped with a contactless interface may be read without the card holder being aware of the fact. This opens up the possibility of fraudulent transactions or denial of service attacks.

SUMMARY

An aspect of the invention provides a card comprising:
a secure element which is capable of hosting a plurality of applications;
at least one external interface configured to communicate between the secure element and an external card reader;
a user interface having a plurality of user-selectable modes, where each mode is associated with a number N of the applications, where N≥0;
a store at the secure element configured to hold response data for use when responding to the external card reader and correspondence data, wherein the response data comprises data about the applications hosted by the card and the correspondence data indicates, for each of the modes, a correspondence between the mode and the response data to be sent for that mode;
wherein the card is configured to allow a user to select one of the plurality of modes for use when the card next communicates with the external reader, the card being configured to:
store a mode indicator indicative of a mode selected by the user at the user interface;
store a usage indicator indicative of whether the card has communicated with an external reader since the mode indicator was stored;
update the value of the usage indicator when the card has communicated with an external reader; and
send response data for the selected mode based on a value of the usage indicator when the card communicates with the external reader.

The card may be configured to, when the secure element communicates an external card reader:
check the value of the usage indicator and:
if the usage indicator indicates that the card has not communicated (or, more generally, has communicated less than N times) with an external reader since that mode was selected, to send the response data corresponding to the user-selected mode via the external interface and not to send the response data corresponding to the non-selected modes;
if the usage indicator indicates that the card has communicated (or, more generally, has communicated more than N times) with an external reader since that mode was selected, to not send the response data corresponding to the user-selected mode via the external interface.

The correspondence data may be a table, or other data structure, and the mode indicator may be an index value which indicates an entry in the table of correspondence data.

The response data may comprise a set of records or templates for the applications hosted by the card and the correspondence data may indicate, for each of the modes, a particular record or template to be sent for that mode.

A card according to any one of the preceding claims wherein the at least one external interface comprises at least one of a contact-based external interface and a contactless external interface.

The correspondence data may comprise:
first correspondence data which indicates, for each of the modes, a correspondence between the mode and the response data for use with communication via the contact-based external interface;
second correspondence data which indicates, for each of the modes, a correspondence between the mode and the response data for use with communication via the contactless external interface.

The first correspondence data may be for a Payment System Environment, PSE, and the second correspondence data may be for a Proximity Payment System Environment, PPSE.

The secure element may be configured to only send the response data corresponding to the user-selected mode via the external interface and not to send the response data corresponding to the non-selected modes when the secure element communicates with the external card reader.

The secure element may be configured to perform authentication with the external card reader when a change is made to the response data via the external interface and wherein the secure element is not configured to perform authentication with the user interface processor when a new mode is signalled to the secure element via the internal interface.

The card may also be configured to operate in a mode in which, when the secure element communicates with the external card reader, the secure element is configured to send the response data corresponding to all of the applications supported by the card.

The mode indicator and the usage indicator may be stored together as a single data byte, with the mode indicator comprising a first nibble of the data byte and the usage indicator comprising a second nibble of the data byte. The terms "first nibble" and "second nibble" are labels, and the actual order of storage may be first nibble followed by second nibble, or second nibble followed by first nibble.

Another aspect of the invention provides a method of operating a card comprising a secure element, at least one external interface to communicate between the secure element and an external card reader and a user interface, the method comprising:
hosting a plurality of applications on the secure element;
storing at the secure element response data for use when communicating with the external card reader and correspondence data, wherein the response data comprises data about the applications hosted by the card and the correspondence data indicates, for each of the modes, a correspondence between a mode and the response data to be sent for that mode;

determining a mode selected by a user at the user interface, wherein the user interface has a plurality of user-selectable modes, each mode associated with a number N of the applications, where N≥0;

storing a mode indicator indicative of the mode selected by the user at the user interface;

storing a usage indicator indicative of whether the card has communicated with an external reader since the mode indicator was stored;

updating the value of the usage indicator when the card has communicated with an external reader; and sending response data for the selected mode based on a value of the usage indicator when the card communicates with the external reader.

Sending response data for the selected mode based on a value of the usage indicator may comprise:

checking the value of the usage indicator and:
  if the usage indicator indicates that the card has not communicated with an external reader since that mode was selected, sending the response data corresponding to the user-selected mode via the external interface and not sending the response data corresponding to the non-selected modes;
  if the usage indicator indicates that the card has communicated with an external reader since that mode was selected, not sending the response data corresponding to the user-selected mode via the external interface.

The method may comprise any of the functions described, or claimed, for the card.

A card in accordance with an example of the present disclosure can allow selection of an application without the need to modify a Payment System Directory, a File Control Information template, or a similar store of response data on the secure element. Instead, the correspondence data points to elements within the Payment System Directory (PSE) or File Control Information (PPSE), or a similar store of response data, which are to be sent based on the mode selected by the user.

An advantage of at least one example is that response data can be stored in any desired order within a store of the secure element. The correspondence data maps the user-selected mode to the response data for the application, or applications, available for use in that mode. The correspondence data can determine order of priority of a plurality of applications available in a mode. This can be useful where different modes use the same application, but that application has a different order of priority in different modes.

An advantage of at least one example is that a user is required to interact with the user interface of the card to select a mode for use during the next transaction. Typically, a user will make this selection of the mode shortly before presenting the card to an external reader. After the card has communicated with the external reader, a further selection of a mode is required. This can help to prevent unintended reading of the card without the user's permission. It can also ensure that only the selected application, or applications, corresponding to the selected mode is authorised for use.

In an example of the present disclosure, the internal interface between the secure element and the user interface processor is not used for personalisation of the secure element. This can avoid the need for secure communication between the user interface processor and the secure element, and therefore avoid the need for additional cryptographic keys and key management for the internal interface.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described or claimed methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIG. 6B shows a data structure sent to the card reader under PPSE;

DETAILED DESCRIPTION

Figure 1:
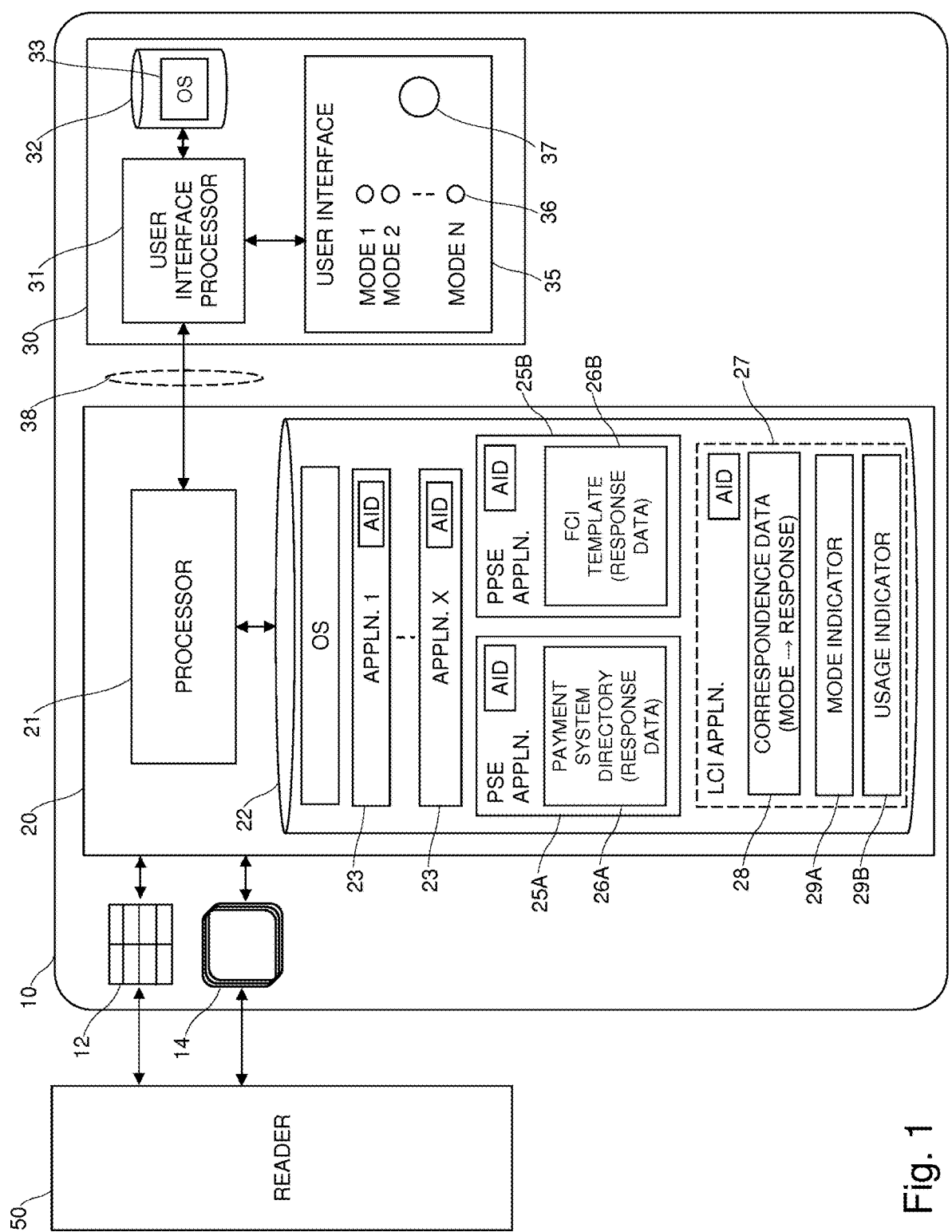
FIG. 1 schematically shows a card with a secure element and a user interface.

FIG. 1 schematically shows an example of an integrated circuit card (ICC) 10, or chip card, with a user interface. The chip card 10 comprises a secure element 20 and a user interface section 30. The user interface section 30 can be in the form of a separate circuitry card which is housed within the body of the card 10. In this example the user interface section 30 comprises a microprocessor 31 which is operatively connected to a user interface 35 comprising a set of LEDs 36 and a button 37. The user interface section 30 may alternatively be called an LED card. An internal interface 38 is provided between the user interface section 30 and the secure element 20. In a preferred arrangement, the user interface section 30 also comprises a battery (not shown). The battery can allow the card to function when the card is not powered via an external card reader 50.

The secure element 20 comprises a processor 21 and storage 22. The secure element 20 is connected to at least one external interface 12, 14 for communicating with an external card reader 50. The external interface may be a contact interface 12 or a contactless interface 14. The secure element 20 may be provided with just a contact interface 12 or just a contactless interface 14, or the secure element 20 may be provided with both a contact interface 12 and a contactless interface 14. Communication between the card 10 and the external card reader 50 may be authenticated, or the communication may not be authenticated.

Communication between the secure element 20 and the user interface section 30 via the internal interface 38 can also be in the form of ISO 7816 Application Protocol Data Units (APDU). In effect, the user interface section 30 operates as a specialised card reader integrated into the card 10.

The user interface processor 31 executes an operating system 33. The operating system 33 allows a user of the card 10 to select an operating mode. The card may support a total of M operating modes, where M is an integer greater than or equal to 1. For example, M=5. Each of the M operating modes can correspond to a number N of applications 23 hosted by the secure element 20, where N is an integer, and N≥0. In a simplest case of a card with a single external interface a mode can correspond to a number N of applications for use by that single external interface. In a case of a card with multiple interfaces, such as a contact external interface 12 and a contactless external interface 14, a mode can correspond to a number $N_{CT}$ of applications for use by the contact interface 12 and a number $N_{CTL}$ of applications for use by the contactless interface 14. For example: operating mode 1 may make available a credit application via the contact interface and a credit application via the contactless interface; operating mode 2 may make available a debit application via the contact interface and no application via the contactless interface. An operating mode may make multiple applications available for use by an external interface.

The secure element 20 can store a plurality of applications 23. FIG. 1 shows X applications, where X is an integer. Each application may be Europay, MasterCard, and Visa (EMV) compliant. Each application has an Application Identifier (AID). The secure element 20 also stores a Payment System Environment (PSE) application 25A, a Proximity Payment System Environment (PPSE) application 25B, and an LED Card Interface (LCI) Application 27. PSE is defined in "EMV®, Integrated Circuit Card Specifications for Payment Systems Book 1 Application Independent ICC to Terminal Interface Requirements", published by EMVCo. PPSE is defined in "EMV® Contactless Specifications for Payment Systems Book B Entry Point Specification", published by EMVCo. The PSE application 25A is an entry point for an external card reader 50 when the card is interrogated via the contact external interface 12. The PSE application 25A comprises a data structure 26A. This data structure 26A comprises information about applications supported by the card and is called a Payment System Directory under PSE. This data structure 26A comprises response data which can be sent to the external card reader 50. Similarly, the PPSE application 25B is an entry point for an external card reader 50 when the card is interrogated via the contactless external interface 14. The PPSE application 25B comprises a data structure 26B. This data structure 26B comprises information about applications supported by the card and is called a File Control Information (FCI) template under PPSE. The data structure 26B comprises response data which can be sent to the external card reader 50. In this specification, the general term "response data" is used to represent stored data about applications which may be sent to an external card reader 50.

The secure element 20 stores a mode indicator 29A. The mode indicator 29A is indicative of an operating mode selected by a user via the user interface section 30. The secure element 20 stores a usage indicator 29B. The usage indicator 29B is indicative of whether the card has communicated with an external reader since the mode indicator was stored.

The secure element 20 also stores correspondence data, or mapping data, 28 which indicates, for each of the modes, a correspondence (mapping) between the mode and the response data 26A, 26B which should be sent to a card reader when the secure element 20 is interrogated for information about applications supported by the card. The mode indicator 29A, usage indicator 29B and the correspondence data 28 may be stored within a functional block 27 which will be called a user interface Application 27, or an LED Card Interface (LCI) Application 27. The LCI Application 27 has an Application Identifier (AID) which is different to the AIDs of other applications on the secure element 20. The user interface processor 31 can communicate with the LCI Application 27 by sending an APDU with the AID of the LCI Application 27.

Figure 2:
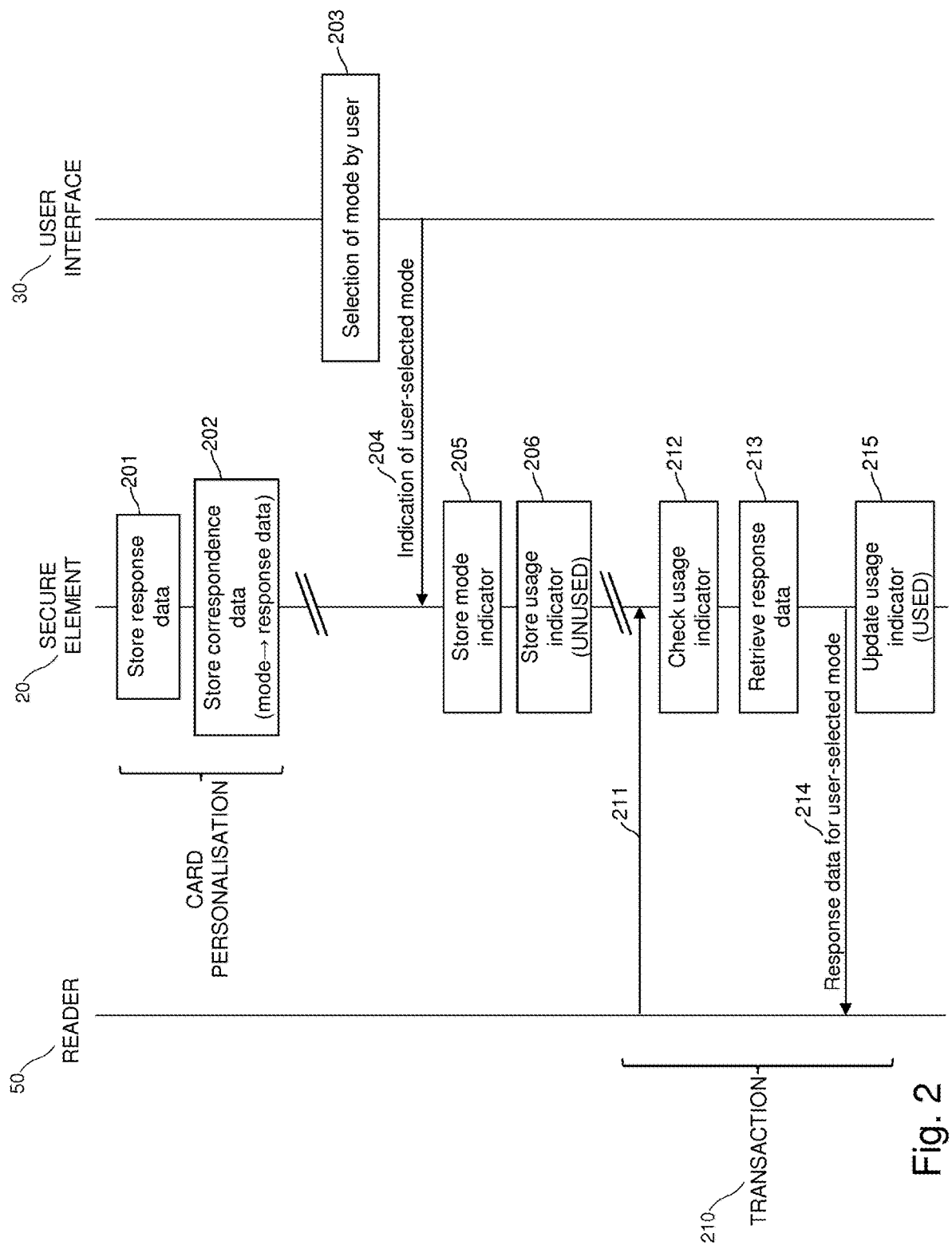
FIG. 2 shows operation of the card.

FIG. 2 shows a method of operating a card. The entities shown in FIG. 2 are: the secure element 20 and the user interface section 30 of the card 10, and an external reader 50. The method allows a user to select one of the plurality of modes. Each of the modes is associated with a number N of applications which are available for use in that mode. After the card has been read it is necessary for the user to re-select the application, or to select a different application, via the user interface 30.

The method comprises storing response data at block 201 and storing correspondence data at block 202. The response data and correspondence data are stored at the secure element 20. Blocks 201 and 202 can be performed during a card personalisation stage before the card is issued to a user. The remaining blocks 203-215 are performed during use of the card. Blocks 203-215 can be performed repeatedly.

At block 203 a user interacts with the user interface 30 to select a mode. This process is described in more detail below. The user interface 30 sends an indication 204 of the user-selected mode to the secure element 20. This communication can be in the form of an ISO 7816 APDU which carries the AID of the LCI Application 27. At block 205 the secure element stores a mode indicator. The mode indicator indicates the mode selected at the user interface. In one example, the mode indicator stored at block 204 is the data element 204 received from the user interface 30. In another example, the mode indicator stored at block 205 is different to the data element 204 received from the user interface, but still is indicative of the mode selected by the user.

At block 206 the secure element stores a usage indicator 29B. The usage indicator is indicative of whether the card has communicated with an external reader since the mode indicator was stored. As the mode has just been selected at block 205, the usage indicator is set to a value indicating that no communication has yet occurred (UNUSED).

Subsequently, the card is presented to an external reader 50 and the reader 50 communicates with the card 10. The communication between the reader and the card is a transaction 210. Usually, communication between the reader and the card is in the form of pairs of command and response messages: a command sent by the reader 50 to the card 10 followed by a response sent from the card 10 to the reader 50. A command-response pair is shown as 211, 213. At block 212 the secure element 20 checks the usage indicator 29B when it receives a command 211 from the reader. The command which triggers this check can be the first command, or a later command during the transaction.

At block 213 the secure element retrieves response data based on the value of the usage indicator 29B. If the usage indicator 29B indicates that the card has not communicated with an external reader since that mode was selected, it retrieves response data corresponding to the user-selected mode and does not retrieve response data corresponding to the non-selected modes. If the usage indicator 29B indicates that the card has already communicated with an external reader since that mode was selected, it does not retrieve the response data corresponding to the user-selected mode. In this example, this is the first communication between the reader and card since the mode was selected and the usage indicator was set to a value indicating the mode is unused. The secure element retrieves response data corresponding to the mode. At block 214 the secure element sends the retrieved data to the reader 50. At block 215 the usage indicator is set to a value indicating that the mode has been used. If the card is subsequently presented to a reader without the user first selecting a mode at the user interface, block 212 will return a value indicating that the mode is used and block 213 will retrieve null data. The user has to select a mode at block 203 and trigger the blocks 204-206 to activate a mode, or re-activate the same mode.

Figure 3:
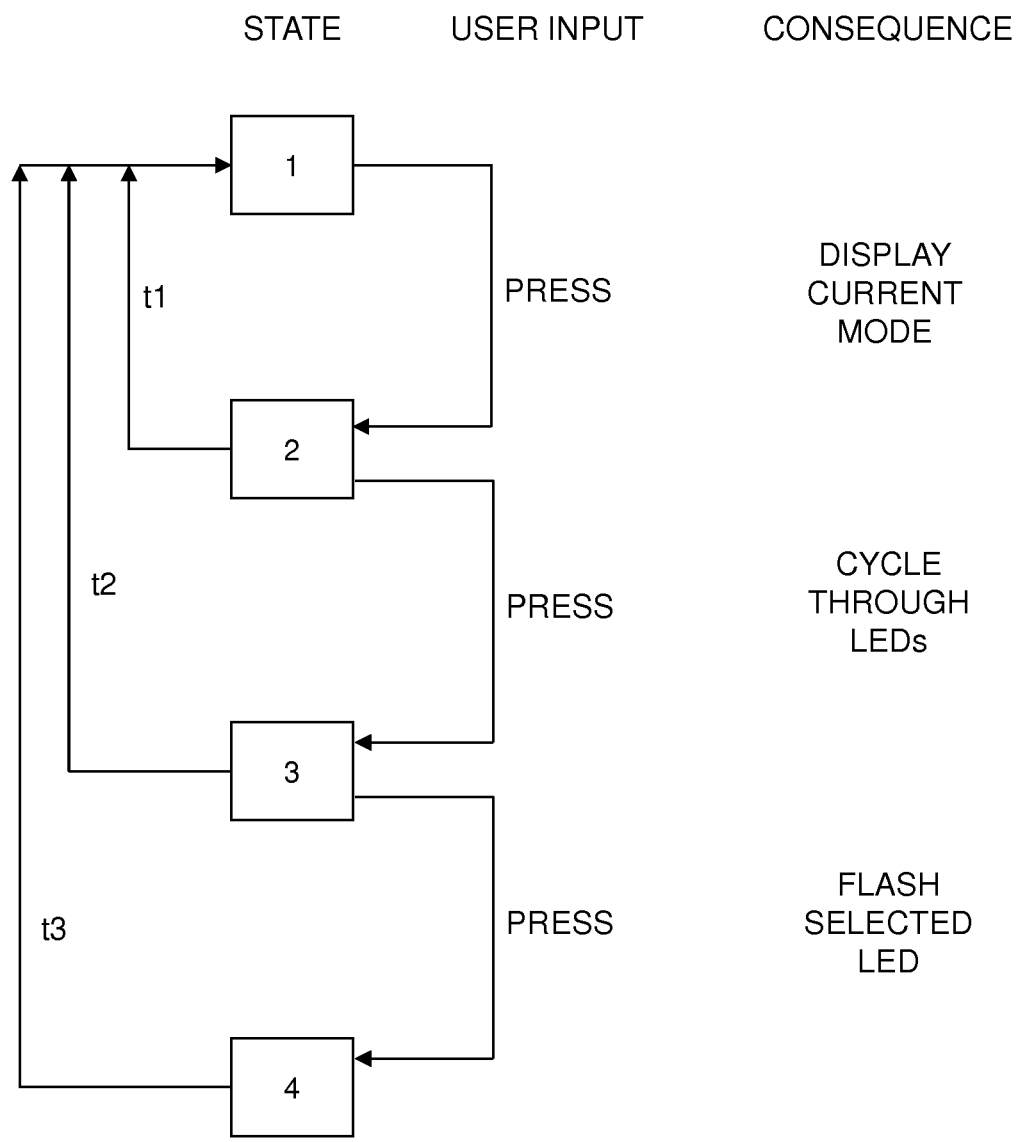
FIG. 3 shows an example state diagram for the user interface section of the card of FIG. 1.

FIG. 3 shows an example state diagram for the operating system of the user interface processor 31. The user interface OS begins in state 1. When the user presses the button 37 (FIG. 1), a timer t1 is started, the state changes to state 2 and an LED corresponding to the currently selected mode is illuminated. The user interface OS remains in state 2 until the timer t1 expires. Upon expiry of timer t1 the user interface OS returns to state 1. If the user presses the button 37 while the user interface OS is in state 2, the state changes to state 3, a timer t2 is started, and the user interface OS illuminates each of the LEDs 36 in turn in a cycle. When the timer t2 expires, the user interface OS returns to state 1. If the user presses the button 37 while the user interface OS is in state 3, the state changes to state 4, a timer t3 is started and the OS flashes the LED 36 that was illuminated at the moment when the user pressed the button 37 while the user interface OS was in state 3. This serves to indicate the user's choice of a new mode. Each LED 36 may be accompanied by a printed indication on the card of an application corresponding to selection of that LED. For example, "Credit" alongside the first LED 36, "Debit" alongside the second LED 36, and so on.

Figure 4:
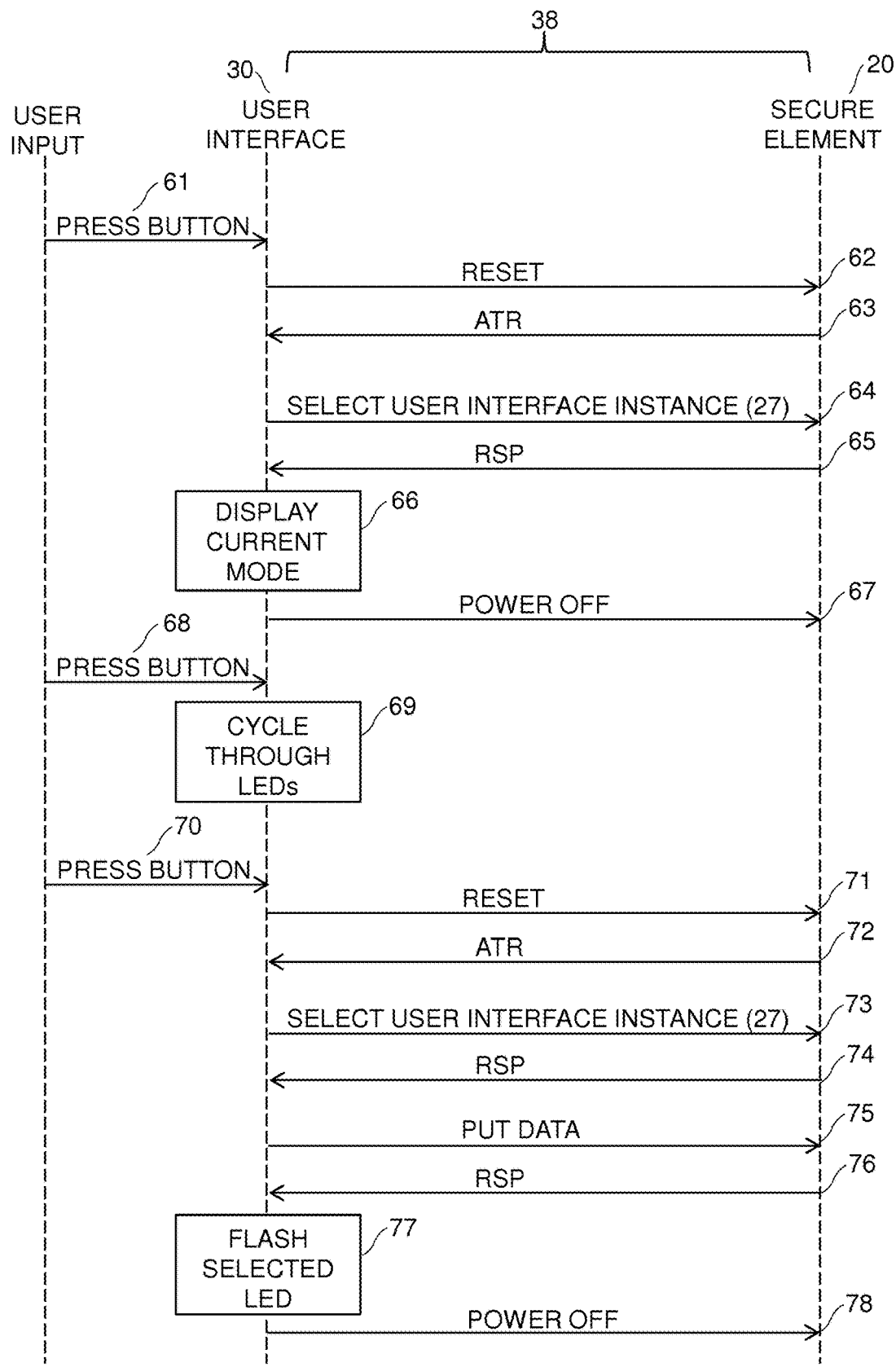
FIG. 4 shows an example of communication between the secure element and the user interface section of the card of FIG. 1 to select an application.

FIG. 4 shows communication between the user interface section 30 and the secure element 20 to control selection of the operating mode. A first press of the button at 61 causes the user interface OS to reset the secure element 20 by sending a RESET command 62. The secure element 20 returns its ATR (answer to reset) 63, the user interface OS sends the secure element a SELECT command to select the functional block 27 (FIG. 1). Functional block 27 can return the following items at 65:
an indication of the currently selected mode;
the total number of LEDs (1 to 5) supported by the card;
a code associated with each mode that indicates whether the mode is a contact mode or a contactless mode.

The total number of LEDs, the code associated with each mode and the configuration byte are set during personalisation of the LED card application.

The functional block 27 may only return a subset of these items. The user interface OS lights the LED corresponding to the currently selected mode at 66, and then signals 67 to the secure element to power off. If the button is pressed at 68 while the user interface OS is still in state 2 (FIG. 3), the user interface OS lights each of the LEDs in turn in a cycle at 69. If the button is pressed 70 while the user interface OS is in state 3 the user interface OS resets the secure element by sending a RESET command 71. The secure element 20 returns its ATR 72. The user interface OS sends a second SELECT command 73 with the same arguments as at 64 and return values from the secure element. The user interface OS sends a PUT DATA command 75 to the functional block 27. This signals to the functional block 27 which mode was selected by the user. Functional block 27 of the secure element updates the card mode and returns 76 a status word indicating successful execution of the PUT DATA command. The user interface OS flashes the LED corresponding to the newly selected mode at 77 and then signals 78 to the secure element to power off. Alternatively, the user interface can signal to the secure element to power off and then flash the LED corresponding to the newly selected mode.

It will be understood that FIGS. 3 and 4 show one possible way in which the user interface section 30 can operate. In the example of FIG. 3 there is an automated cycle through the possible modes and a user presses the button 37 to select one of the modes. Various other ways of selecting a mode are possible. In another example, the user interface section 30 can advance manually through the possible modes in response to button presses. Each button press causes the user interface to advance to the next mode and illuminate the LED corresponding to that mode. A mode is selected when no further button press has been received within a predetermined time period. The user interface can indicate the selected mode by flashing the LED corresponding to the selected mode.

Figures 5A, 5B, 5C:
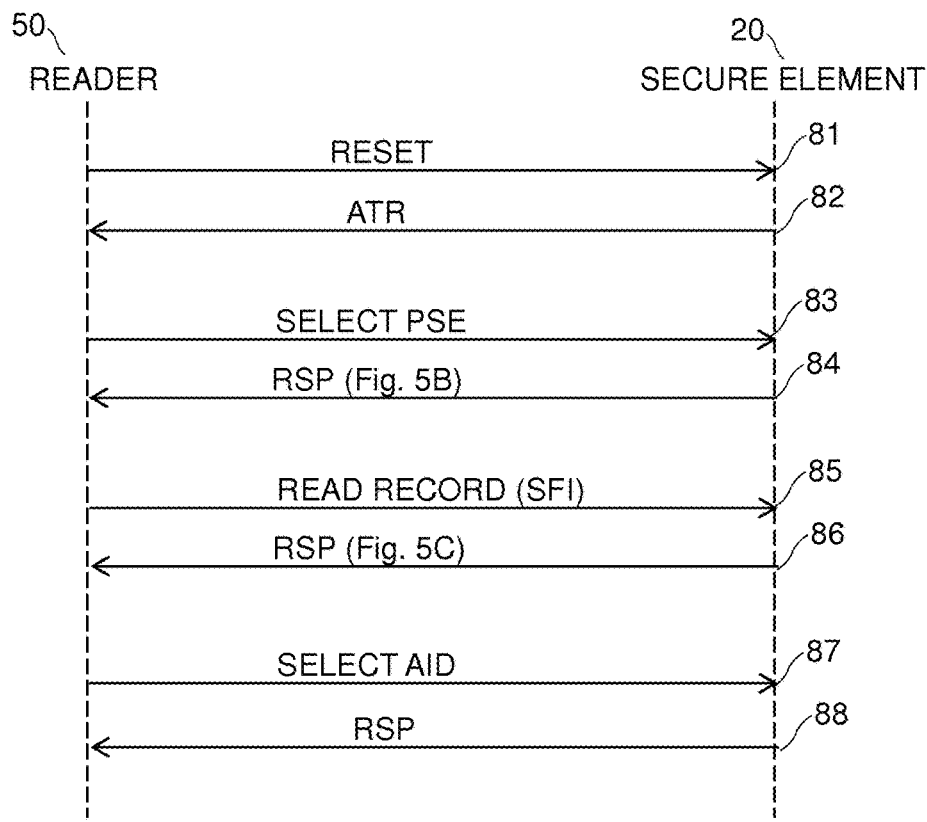
FIG. 5A shows communication between an external card reader and a card under a Payment System Environment (PSE)
FIG. 5B shows a data structure sent to the card reader under PSE.
FIG. 5C shows a data record forming part of a payment system directory.

A brief overview will be provided of conventional operation between an external reader and a card before describing examples of the present disclosure. FIG. 5A is a sequence diagram illustrating selection of an EMV application under a Payment System Environment (PSE). When a chip card is presented to a card reader 50, a communication exchange begins between the card reader 50 and the secure element 20 of the card 10. An EMV transaction begins with a Reset/ATR pair 81, 82 followed by a SELECT/RSP pair 83, 84. The EMV selection procedure begins by building a list of candidate applications. In order to do this, the card reader 50 fetches application identifiers (AIDs) from particular files or data structures stored on the card 10. Each AID is associated with a given priority. Once the list of AIDs supported by the card 10 is established, the reader 50 selects the application supported by the reader 50 that has the highest priority. The return value to the first SELECT command 83, sent in response 84, includes the data structure shown in FIG. 5B. This data structure indicates the file 91 to read in order to find the identifiers of the applications supported by the card. This file is known as the "Payment System Directory". The conventional procedure is to read all the records in the Payment System Directory. One record is shown in FIG. 5C. The reader will choose the record with the highest application priority indicator 93 of the applications that the reader supports.

This procedure is modified in accordance with an example of the present disclosure. A user of the card 10 can select an application which they wish to use when the card is interrogated by an external reader 50. The LCI application 27 stores an indication 29 of the user-selected mode. The procedure for communicating between an external card reader 50 and the card 10 is the same as shown in FIG. 5A up to the point where the card reader 50 sends the READ RECORD command 85. At this point the procedure is modified. Logic at the secure element 20 checks the mode selected by the user and modifies the data retrieved by the READ RECORD command based on the mode, as follows:

```
mode = currently selected mode from functional block 27;
if mode == 0
    card behaves as a standard EMV card;
else {
    n = get-configuration-byte;
    READ RECORD n from Payment System Directory;
}
```

Figure 5D:
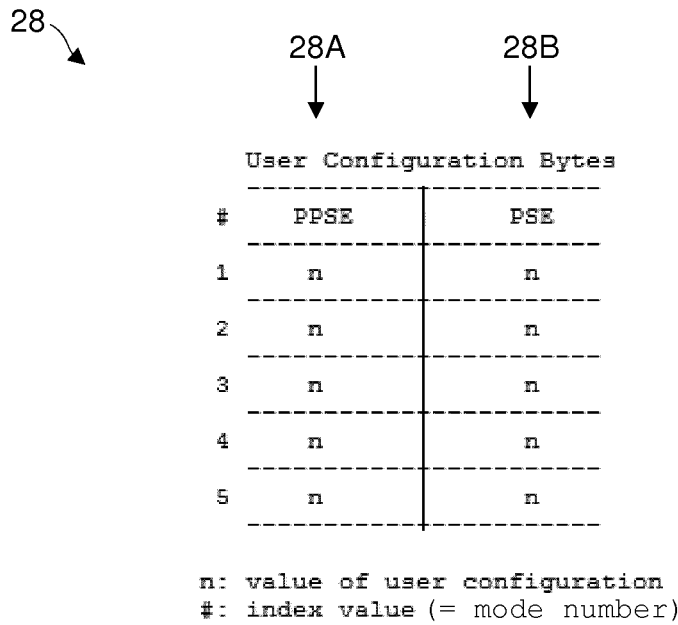
FIG. 5D shows an example of correspondence data which maps between the operating modes of the card and response data.

If the mode=0, the READ RECORD command operates in a conventional manner. It retrieves and sends records of the entire Payment System Directory to the card reader 50. If the mode=1, 2, . . . N, the READ RECORD command does not retrieve the entire Payment System Directory but, instead, retrieves a particular record within the Payment System Directory. FIG. 5D shows an example of a table of correspondence data 28 which maps between the operating modes of the card and response data. The function "get-configuration-byte" performs a look-up in the table 28. The look-up location is the column "PSE" and the row corresponding to the value of the currently selected mode. The returned value from the cell of table 28 specifies the record in the Payment System Directory that should be sent to the card reader. The response 86 only includes that record of the Payment System Directory. The subsequent SELECT AID command 87 includes the AID of the application returned to the card reader at 86. In this way, the card reader 50 is forced to use the application selected by the user.

Figure 6A:
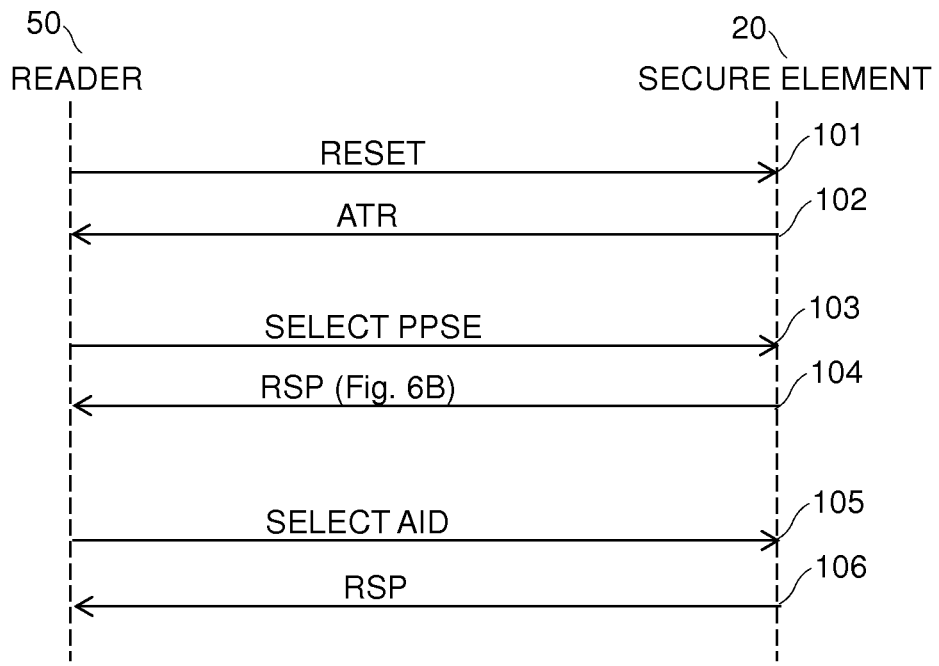
FIG. 6A shows communication between an external card reader and a card under a Proximity Payment System Environment (PPSE)

FIG. 6A is a sequence diagram to illustrate selection of an EMV application under a Proximity Payment System Environment (PPSE). When a chip card is presented to a card reader 50, a communication exchange begins between the card reader 50 and the secure element 20 of the card 10. An EMV transaction begins with a Reset/ATR pair 101, 102 followed by a SELECT/RSP pair 103, 104. The EMV selection procedure begins by building a list of candidate applications. The list of applications supported by the card is contained directly in the response 104 to the SELECT PPSE command 103. The response is shown in FIG. 6B. The response includes application identifiers (AIDs) 96 of applications supported by the card. Each AID is associated with a given priority. Once the list of AIDs supported by the card is established, the reader selects the application that is supported by the reader that has the highest priority.

This procedure is modified in accordance with an example of the present disclosure. A user of the card 10 can select an application which they wish to use when the card is interrogated by an external reader. The LCI application 27 stores an indication 29 of the user-selected mode. The procedure begins as shown in FIG. 6A with a RESET/ATR pair 101, 102. The SELECT PPSE is modified. Logic at the secure element 20 checks the mode selected by the user and modifies the data retrieved by the SELECT PPSE command based on the mode, as follows:

```
mode = currently selected mode from functional block 27;
if mode == 0
    card behaves as a standard EMV card;
else {
    n = get-configuration-byte;
    SELECT PPSE return modified FCI template;
}
```

As with PSE, the logic uses a table 28 of correspondence data shown in FIG. 5D. The function "get-configuration-byte" performs a look-up in the table 28. The look-up location is the column "PPSE" 28A and the row corresponding to the value of the currently selected mode. The cell maps to a FCI containing just one of the application templates 96 corresponding to the operating mode/application selected by the user. The value of the cell in table 28 can be an index (n) to the $n^{th}$ template in a set of templates. The response 104 only includes that template from the total set of templates. The subsequent SELECT AID command 105 includes the AID of the application returned to the card reader at 104. In this way, the card reader 50 is forced to use the application selected by the user.

An advantage of operating in this way is that the user interface section 30 is fully isolated from the details of the different payment system environments. The user interface section 30 interacts with a single functional block (the LCI application) 27 on the secure element 20. The mapping of the operating mode to a payment application is held in the LCI application 27, within the secure environment of the secure element 20. This arrangement means that there is no requirement for the user interface section 30 to hold any information about the particular payment applications running on the secure element, such as the AID (application identifier) or cryptographic keys required in order to access payment application files. When a user selects a different application at the user interface, there is no change to data stored at the secure element, other than to store a new value of the mode selected by the user. The LCI application 27 points to existing data stored in the data structures 26A, 26B. There is no need to modify the data structures 26A, 26B. The Payment System Directory 26A under PSE and the File Control Information template 26B under PPSE can be conventional.

In addition to the user-selectable modes, the card may have a default mode, e.g. mode=0, in which when the secure element is interrogated by the external card reader 50, the secure element 20 is configured to respond in a conventional manner and send the response data corresponding to all of the applications supported by the card.

Figure 7:
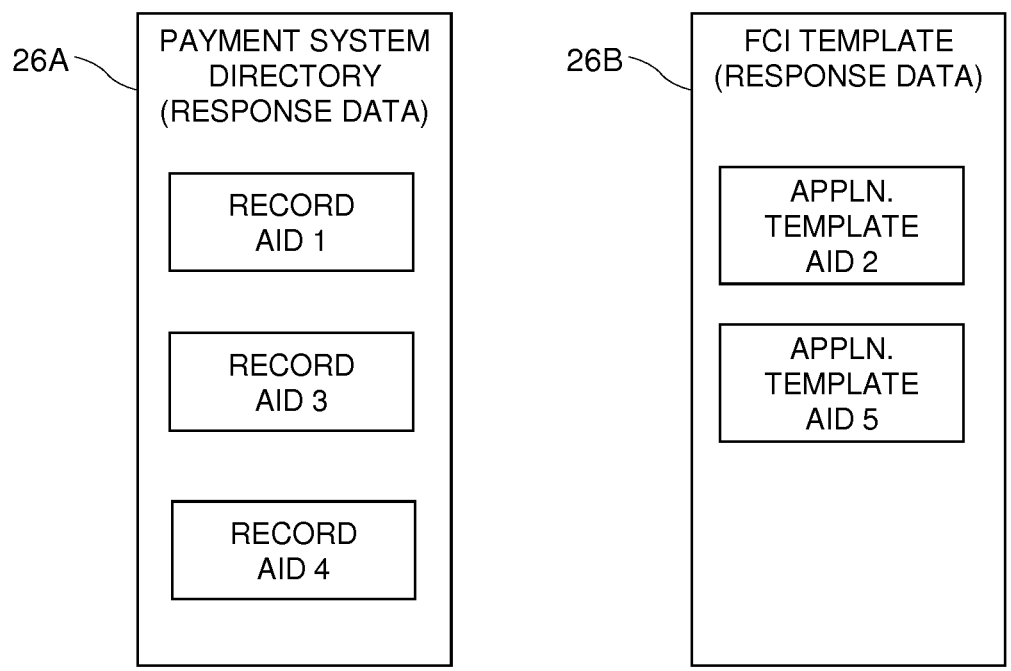
FIG. 7 shows another example of correspondence data and response data.

FIG. 7 shows another example of a table of correspondence data 28 which maps between the operating modes of the card and response data. In this example there are three applications available under PSE and two applications available under PPSE. These applications have corresponding records in the Payment System Directory 26A and FCI template 26B. There are three records in the Payment System Directory 26A. Each record stores a value of an AID corresponding to an application hosted by the card: record 1 stores a value of AID 1, record 2 stores a value of AID 3 and record 3 stores a value of AID 4. There are two application templates in the FCI template 26B. Each application template stores a value of an AID corresponding to an application hosted by the card: application template 1 stores a value of AID 2, application template 2 stores a value of AID 5.

The function "get-configuration-byte" performs a look-up in the table 28. The look-up location is the column "PSE"

and the row corresponding to the value of the currently selected mode. The returned value from the cell of table 28 specifies the record in the Payment System Directory that should be sent to the card reader. The response 86 only includes that record of the Payment System Directory. The subsequent SELECT AID command 87 includes the AID of the application returned to the card reader at 86. In this way, the card reader 50 is forced to use the application selected by the user.

Figure 8:
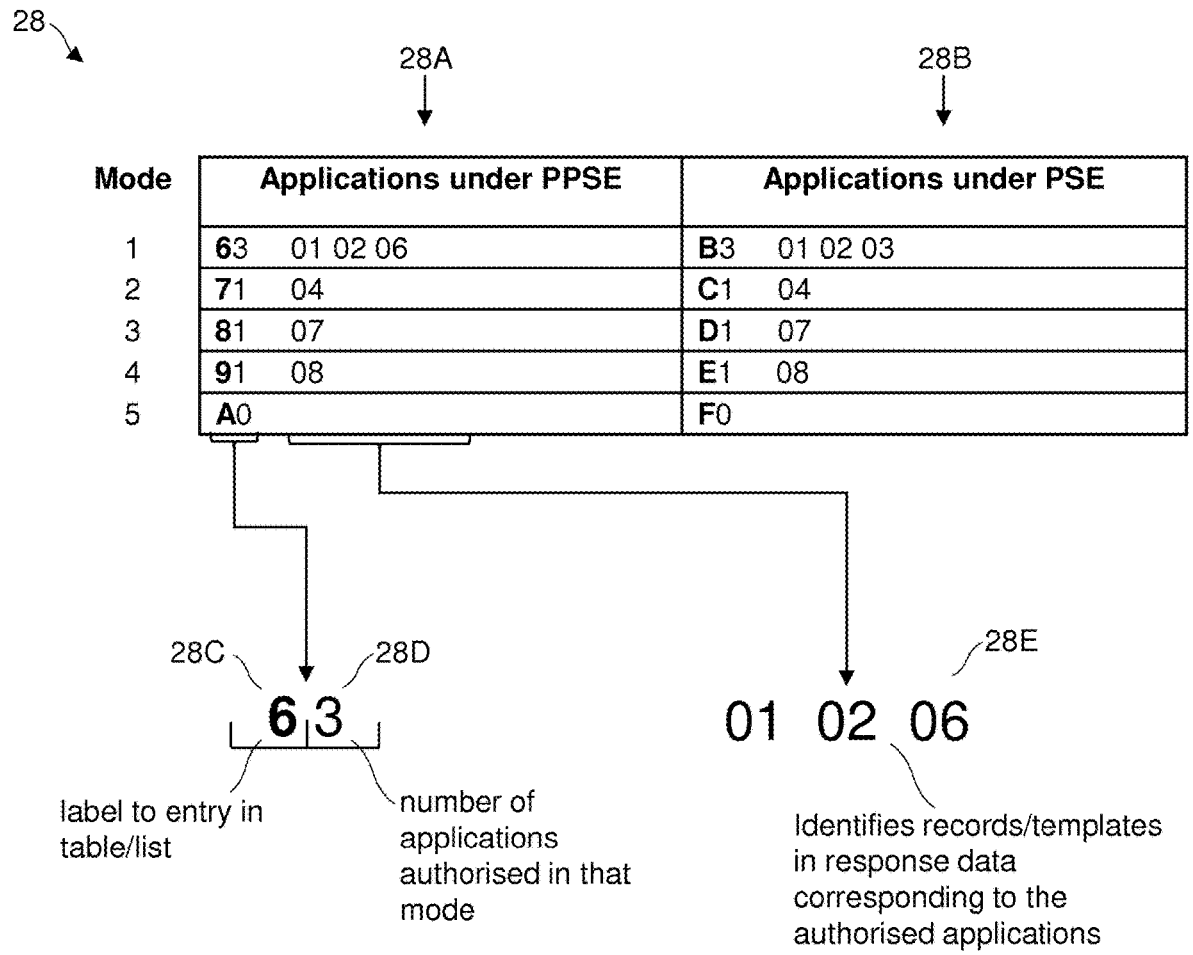
FIG. 8 shows another example of correspondence data.

FIG. 8 shows an example of correspondence data 28 which allows a plurality of applications to be enabled. The data structure is similar to the data structure shown in FIG. 5D and FIG. 7. The data structure has an entry corresponding to each mode and each supported external interface (PPSE, PSE). Each entry in the data structure holds an index to an application, or a plurality applications, available under PPSE or PSE. In this example, in mode 1 there are three applications under PPSE (records 1, 2 and 6) and three applications under PSE (records 1, 2 and 3). The number of authorised applications can be any value from 0 (e.g. mode 5 has no applications enabled) to an upper limit.

Optionally, each entry in the data structure of correspondence data 28 can comprise an identifier 28D of the number of enabled applications. In the example of FIG. 8, each entry in the data structure of correspondence data 28 comprises an identifier 28D of the number of applications enabled for that mode, i.e. a number of records/templates to return to the external reader as response data. For example, mode 1 under PPSE has an identifier "3", indicating 3 applications. The subsequent data 28E is a list of references to the records/templates for those applications. In the same example, the records/templates are numbers 1, 2 and 6 in the set of response data. The order of the application identifiers 28E can indicate priority. A Priority indicator can be allocated to the records/templates (EMV Tag) equal to the order in the table of correspondence data 28. In this same example of mode 1 under PPSE, the applications have the priority order: 1, 2, 6.

Optionally, each entry in the data structure of correspondence data 28 can comprise a label 28C to that data structure entry. The label is unique within the data structure 28. The label 28C allows the data structure to be traversed (parsed) more quickly. In the example of FIG. 8, the entries corresponding to modes under PPSE are labelled: 6, 7, 8, 9, A, and the entries corresponding to modes under PSE are labelled: B, C, D, E, F. The PPSE label corresponding to a mode is determined by calculating: mode identifier+5. The PSE label corresponding to a mode is determined by calculating: mode identifier+10. For example, mode 2 under PPSE is:

PPSE_label=2+5=7 and mode 2 under PSE is:

PSE_label=2+10=C.

Conveniently, in the example of FIG. 8 the label 28C and the identifier 28D are combined into a single data byte, with the first nibble of the data byte carrying the label 28C and the second nibble of the data byte carrying the identifier 28D. It will be understood that the identifiers and labels can be stored in other ways.

The table shown in FIG. 8 (or FIGS. 5D, 7) may be stored as a list of data elements. In FIG. 8 the list is: 63 01 02 06 71 04 81 07 91 08 A0 B3 01 02 03 C1 04 D1 07 E1 08 F0. This order allows the data corresponding to contactless transactions to be parsed more quickly, as the transaction time for contactless transactions is more critical than contact transactions.

When a mode is selected, the correspondence data 28 is parsed to find an entry corresponding to the mode and the interface (PPSE, PSE). As explained above, in the example of FIG. 8 a label corresponding to the mode and interface is determined (PPSE label=mode+5; PSE label=mode+10). A look-up is performed in the correspondence data using the label. Once the corresponding label is found, the corresponding number of indexes is parsed until the last one. If the index for the corresponding interface in use is not found, the platform (or the application) rejects the selection.

Examples have been described in which the card supports a Payment System Environment (PSE) and a Proximity Payment System Environment (PPSE). The table of FIG. 5D has two columns corresponding to PSE and PPSE. In other examples, the card may only support PSE or PPSE. The table shown in FIG. 5D, 7 or 8 may be simplified to a single column.

The use of correspondence data avoids the need for a link between the mode number and the order in which the response data 26A, 26B is stored. This allows all personalisation to be restricted to data stored in the secure element.

Figure 9A:
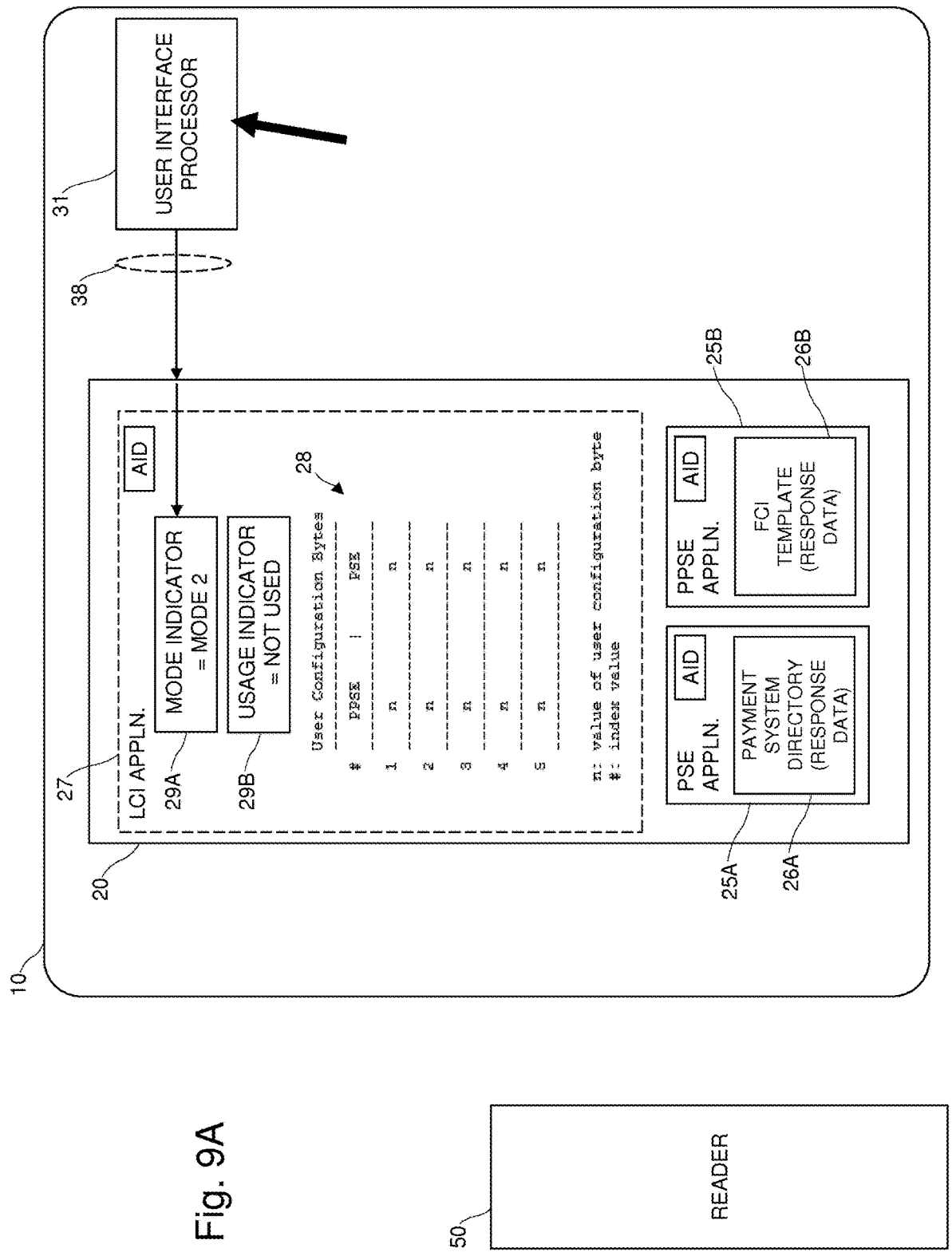
FIGS. 9A and 9B show operation of the card.
Figure 9B:
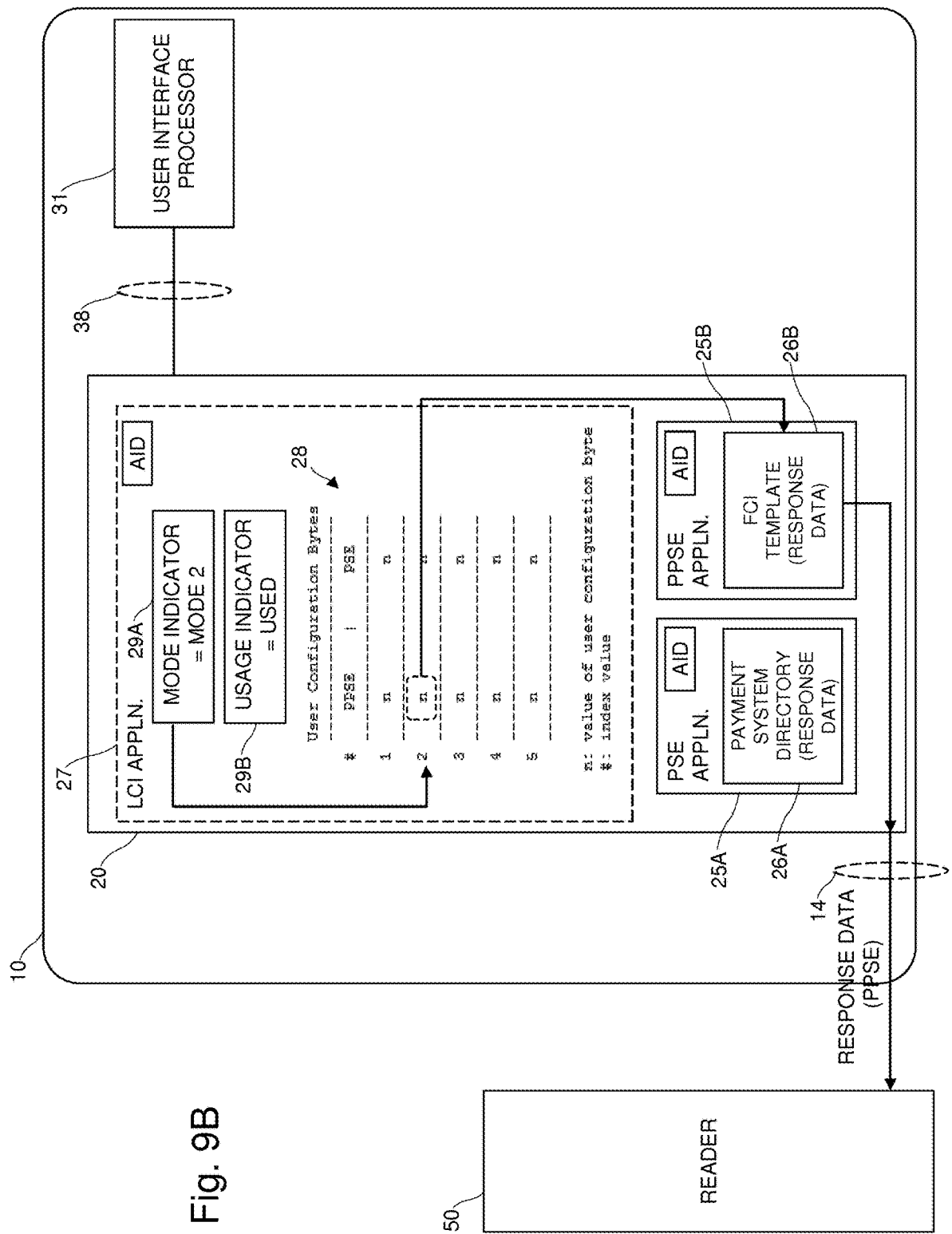

For completeness, FIGS. 9A and 9B show an overview of the mode selection process. FIG. 9A shows the initial selection of a mode. In this example, a user makes a selection of operating mode 2 by operating the user interface. The user interface processor 31 signals to the secure element 20, via the internal interface 38, that mode 2 has been selected. The user interface processor 31 can send an APDU with the AID of the LCI Application 27. The secure element 20 stores an indication 29 that operating mode 2 was selected. Operating mode 2 corresponds to application 2 supported by the card, such as a debit application or some other application that the user wishes to use.

FIG. 9B shows a subsequent communication between a reader 50 and the card. In this example, it is assumed that a contactless reader interrogates the card via a contactless external interface 14. The communication exchange detailed in FIG. 5A occurs. When the secure element 20 is asked to supply details of the applications it supports, the secure element 20 responds with details of the application selected by the user (=application 2). This occurs by performing a look up in the table 28 of correspondence data, using the user-selected mode (2) as an index in the table 28. An entry in the table 28 at row 2 and column PPSE indicates a value n. Value n is used as an index to select a template to send in the response to the card reader 50. For the example of FIG. 7, mode 2 under PPSE corresponds to the second application template (n=2) in response data 26B, which stores AID=5. In this way, the card reader 50 only receives details of the application (with AID=5) that the user wishes to use, and does not receive details of other applications. Therefore, the card reader is prevented from automatically selecting an application which the user does not wish to use. The selection of the application at the card 10 is made without the need to exchange any secure data between the secure element 20 and the user interface section 30 of the card. Personalisation of the card can be performed in a conventional manner, by using the external interfaces 12, 14 between the secure element 20 and the reader 50. No personalisation of the card is performed via the internal interface 38 between the secure element 20 and the user interface section 30.

The user interface section 30 of the card 10 may also allow a user to turn the contactless interface on or off. As part of the communication between the user interface section 30 and the secure element 20, the user interface section 30 may receive data which indicates whether the contactless interface should be turned on/off for the selected mode. A response from the functional block 27 can include a byte of data which indicates, for each mode, whether the contactless interface should be turned on or off. For example, each bit position of this byte can represent a mode (bit 1=mode 1, bit 2=mode 2, etc.) and the value of the bit can indicate if the contactless interface is to be turned on or off (e.g. bit="1" means contactless interface is switched on, bit="0" means contactless interface is switched off.

FIG. 1 shows a card 10 with a secure element 20 and a user interface section 30 embedded within the card 10. In another possible example, the secure element is hosted by an electronic device, such as a smart phone. The user interface section can be provided by user interface functionality of the host device, such as a graphical user interface (GUI) or a touch screen user interface. The functionality of the user interface may be provided by a processor which performs other tasks for the host device, rather than a dedicated user interface processor 31 as shown in FIG. 1. The user interface of the host device allows a user to select an operating mode for the secure element. In a similar way to described above, the user interface section of the host device can communicate to the secure element an indication of a mode selected by the user at the user interface. Operation of the secure element is the same as described above.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A card, comprising:
a secure element (20) configured to host a plurality of applications (23);
at least one external interface (12, 14) configured to communicate between the secure element and an external card reader (50);
a user interface (30, 35) having a plurality of user-selectable modes, where each mode is associated with a number N of the applications (23), where N>0; and
a store at the secure element configured to hold response data (26) for use when responding to the external card reader (50) and correspondence data (28), wherein the response data (26) comprises data about the applications (23) hosted by the card and the correspondence data (28) indicates, for each of the modes, a correspondence between the mode and the response data (26) to be sent for that mode,
wherein the card is configured to allow a user to select one of the plurality of modes for use when the card next communicates with the external card reader (50), the card being configured to:
store a mode indicator (29A) indicative of a mode selected by the user at the user interface (35);
store a usage indicator (29B) indicative of whether the card has communicated with the external card reader since the mode indicator was stored;
update the value of the usage indicator (29B) when the card has communicated with the external card reader; and
send response data for the selected mode based on a value of the usage indicator (29B) when the card communicates with the external card reader (50).

2. The card according to claim 1, wherein said card is configured to, when the secure element (20) communicates the external card reader (50):
check the value of the usage indicator (29B) and:
if the usage indicator (29B) indicates that the card has not communicated with the external card reader since that mode was selected, to send the response data (26) corresponding to the user-selected mode via the external interface (12, 14) and not to send the response data (26) corresponding to the non-selected modes; and
if the usage indicator (29B) indicates that the card has communicated with the external card reader since that mode was selected, to not send the response data (26) corresponding to the user-selected mode via the external interface (12, 14).

3. The card according to claim 1, wherein the correspondence data (28) is a table and the mode indicator (29A) is an index value which indicates an entry in the table of correspondence data (28).

4. The card according to claim 1, wherein the response data (26) comprises a set of records or templates for the applications (23) hosted by the card and the correspondence data (28) indicates, for each of the modes, a particular record or template to be sent for that mode.

5. The card according to claim 1, wherein the at least one external interface comprises at least one of a contact-based external interface (12) and a contactless external interface (14).

6. The card according to claim 5, wherein the correspondence data (28) comprises:
first correspondence data which indicates, for each of the modes, a correspondence between the mode and the response data (26A) for use with communication via the contact-based external interface (12); and
second correspondence data which indicates, for each of the modes, a correspondence between the mode and the response data (26B) for use with communication via the contactless external interface (14).

7. The card according to claim 6, wherein the first correspondence data is for a Payment System Environment (PSE), and the second correspondence data is for a Proximity Payment System Environment (PPSE).

8. The card according to claim 1, wherein the secure element (20) is configured to only send the response data (26) corresponding to the user-selected mode via the external interface (12, 14) and not to send the response data (26) corresponding to the non-selected modes when the secure element (20) communicates with the external card reader (50).

9. The card according to claim 1, wherein the secure element (20) is configured to perform authentication with the external card reader (50) when a change is made to the response data via the external interface (12, 14) and wherein the secure element (20) is not configured to perform authentication with the user interface processor (31) when a new mode is signalled to the secure element (20) via the internal interface (38).

10. The card according to claim 1, wherein said card is also configured to operate in a mode in which, when the secure element communicates with the external card reader (50), the secure element (20) is configured to send the response data (26) corresponding to all of the applications supported by the card.

11. The card according to claim 1, wherein the mode indicator (29A) and the usage indicator (29B) are stored together as a single data byte, with the mode indicator (29A) comprising a first nibble of the data byte and the usage indicator comprising a second nibble of the data byte.

12. A method of operating a card that has a secure element (20), at least one external interface (12, 14) to communicate between the secure element and an external card reader (50) and a user interface (35), the method comprising:
  hosting a plurality of applications (23) on the secure element;
  storing at the secure element response data (26) for use when communicating with the external card reader (50) and correspondence data (28), wherein the response data (26) comprises data about the applications (23) hosted by the card and the correspondence data (28) indicates, for each of the modes, a correspondence between a mode and the response data (26) to be sent for that mode;
  determining a mode selected by a user at the user interface (35), wherein the user interface has a plurality of user-selectable modes, each mode associated with a number N of the applications (23), where N>0;
  storing a mode indicator (29A) indicative of the mode selected by the user at the user interface (35);
  storing a usage indicator (29B) indicative of whether the card has communicated with the external card reader since the mode indicator was stored;
  updating the value of the usage indicator (29B) when the card has communicated with the external card reader; and
  sending response data for the selected mode based on a value of the usage indicator (29B) when the card communicates with the external card reader (50).

13. The method according to claim 12, wherein the sending response data for the selected mode based on a value of the usage indicator (29B) comprises:
  checking the value of the usage indicator (29B) and:
  if the usage indicator (29B) indicates that the card has not communicated with the external card reader since that mode was selected, sending the response data (26) corresponding to the user-selected mode via the external interface (12, 14) and not sending the response data (26) corresponding to the non-selected modes; and
  if the usage indicator (29B) indicates that the card has communicated with the external card reader since that mode was selected, not sending the response data (26) corresponding to the user-selected mode via the external interface (12, 14).

14. The method according to claim 12, wherein the response data (26) comprises a set of records or templates for the applications (23) hosted by the card and the correspondence data (28) indicates, for each of the modes, a particular record or template to be sent for that mode.

15. The method according to claim 12, wherein the correspondence data (28) comprises:
  first correspondence data which indicates, for each of the modes, a correspondence between the mode and the response data (26A) for use with communication via a contact-based external interface (12); and
  second correspondence data which indicates, for each of the modes, a correspondence between the mode and the response data (26B) for use with communication via a contactless external interface (14).

16. The card according to claim 2, wherein the correspondence data (28) is a table and the mode indicator (29A) is an index value which indicates an entry in the table of correspondence data (28).

17. The card according to claim 2, wherein the response data (26) comprises a set of records or templates for the applications (23) hosted by the card and the correspondence data (28) indicates, for each of the modes, a particular record or template to be sent for that mode.

18. The card according to claim 3, wherein the response data (26) comprises a set of records or templates for the applications (23) hosted by the card and the correspondence data (28) indicates, for each of the modes, a particular record or template to be sent for that mode.

19. The card according to claim 2, wherein the at least one external interface comprises at least one of a contact-based external interface (12) and a contactless external interface (14).

20. The card according to claim 3, wherein the at least one external interface comprises at least one of a contact-based external interface (12) and a contactless external interface (14).

* * * * *